Oct. 11, 1966  G. E. ROWE  3,278,290
MOLD HOLDER FOR GLASSWARE FORMING MACHINE
Filed July 19, 1963  2 Sheets-Sheet 1
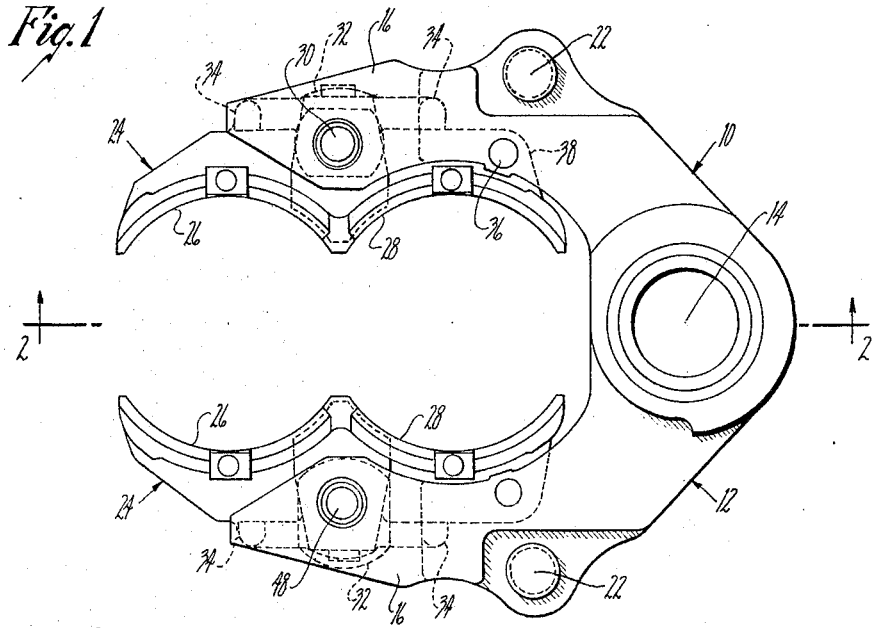
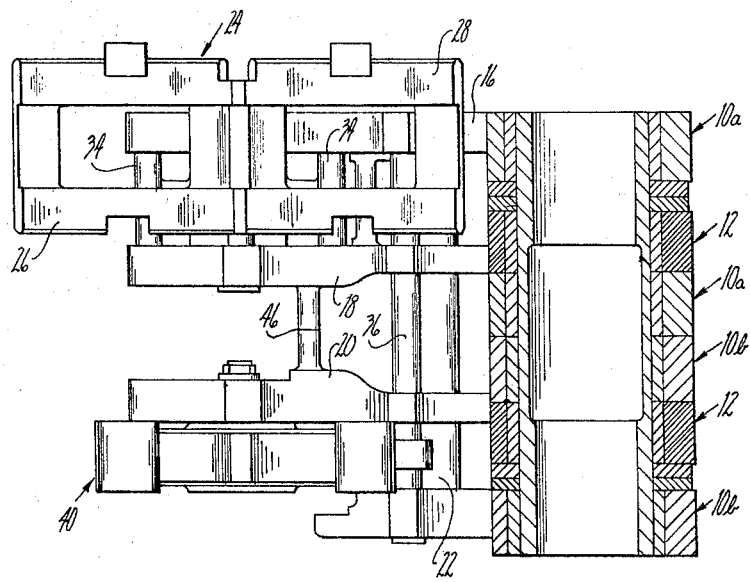
INVENTOR.
GEORGE E. ROWE
BY
McCormick, Paulding & Huber
ATTORNEYS Oct. 11, 1966 G. E. ROWE 3,278,290
MOLD HOLDER FOR GLASSWARE FORMING MACHINE
Filed July 19, 1963 2 Sheets-Sheet 2
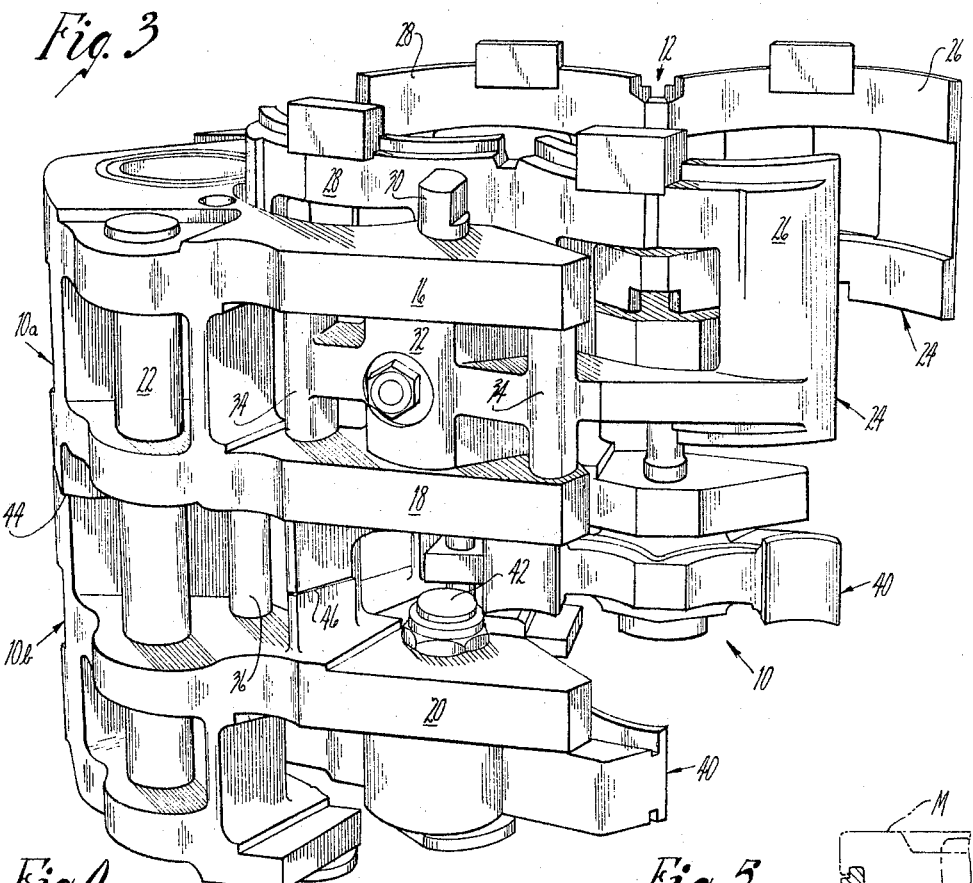
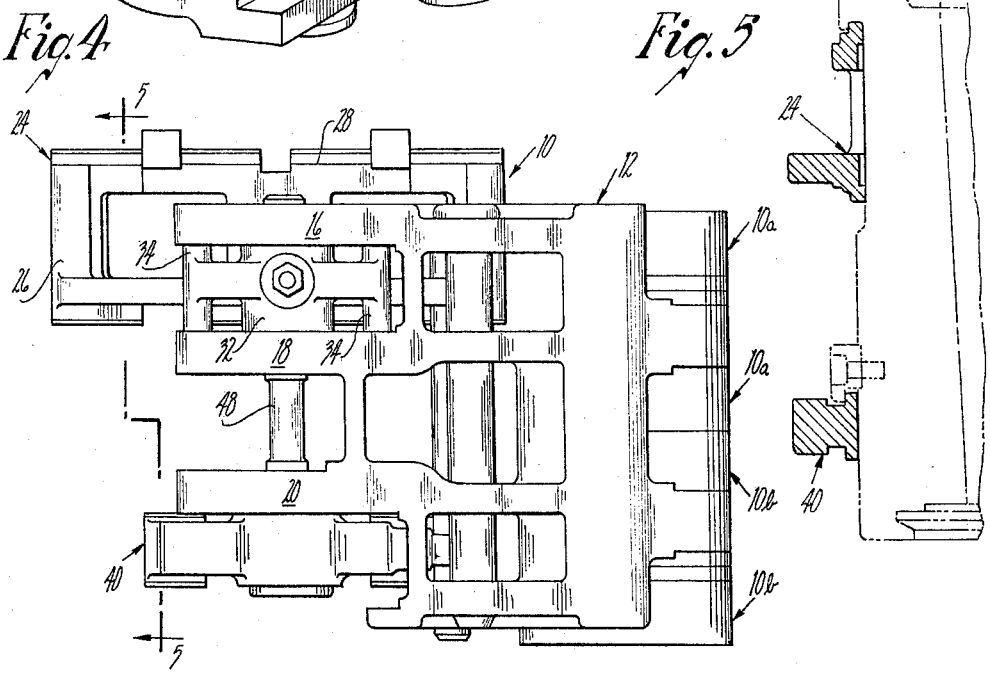

3,278,290
MOLD HOLDER FOR GLASSWARE
FORMING MACHINE
George E. Rowe, Wethersfield, Conn., assignor to Emhart Corporation, a corporation of Connecticut
Filed July 19, 1963, Ser. No. 296,345
6 Claims. (Cl. 65—323)

This invention relates to an improved mold holder apparatus for a glassware forming machine and, more particularly, to an improved mold holder that is adapted for use on the well-known Hartford I.S. glassware forming machine.

In such machines, whether they be adapted for blow-and-blow operation or for press-and-blow operation, the mold or molds at the initial blow or press station and at the final blowing station generally comprise separable halves that are engaged in a substantially vertical plane to define the mold cavity or cavities. Heretofore, some difficulty has been encountered in providing mold holders that will properly engage the mold halves and apply sufficient clamping force to their engagement over the entire vertical extent of their engagement in the aforementioned substantially vertical plane. This difficulty is increased in the case of elongated molds that are adapted particularly for the making of elongated articles of glassware such as long bottles and tall tumblers or the like. The difficulty is even more noticeable and enhanced in "double gob" operation wherein two molds are used at the initial or blanking station and at the final blowing station.

It is the general object of the present invention to provide a mold holder apparatus for holding and clamping separable mold halves in such a way that a substantially uniform clamping force can be applied over the entire vertical extent of the mold halves as they are engaged in a substantially vertical plane.

A further and more specific object of the invention is to provide a mold holder apparatus as heretofore described and which can be readily installed in existing glassware forming machines such as the Hartford I.S. machine without requiring modification of the machine per se and which can be used in nearly identical form at both the initial station and at the final shaping station of the machines.

A still further object of the invention is to provide a mold holder apparatus having the aforesaid characteristics and which is readily adapted to either "single gob" or "double gob" operation of the machine in the making of glassware either one article at a time or two articles at a time.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a top plan view of a mold holder apparatus constructed in accordance with the present invention;

FIG. 2 is a vertical sectional view of the apparatus shown in FIG 1 and taken along the line 2—2 of FIG 1;

FIG. 3 is a perspective view at a slightly larger scale of the mold holder apparatus;

FIG. 4 is an elevational view of the mold holder apparatus taken from one side thereof; and FIG. 5 is a vertical sectional view taken as indicated by the irregular line 5—5 of FIG. 4.

As mentioned above, the mold holder apparatus of the present invention is adapted for installation on existing glassware forming machines, such as the Hartford I.S. machine. The said I.S. machine is shown in Ingle Patent No. 1,911,119. The machine shown in the Ingle patent is adapted for "single gob" operation. The mold holder apparatus shown herein for purposes of illustration is adapted for "double gob" operation, but the mold holder apparatus of this invention can be substituted for that shown in the Ingle patent for operation in the same position and by the same means shown therein.

As best shown in FIG. 1, the present mold holder apparatus comprises right and left-hand sections, indicated generally by the reference numbers 10 and 12 that are pivotally supported on a common substantially vertical axis 14. As will be described in greater detail hereinafter, one of said sections, namely the lefthand section 12, is of one-piece construction having at least one substantially horizontal upper arm and one substantially horizontal lower arm. The other section, the right-hand section 10, is of two-piece construction with one piece having at least one substantially horizontal upper arm and the second piece having one substantially horizontal lower arm. The arms on the respective sections cooperate to support an associated mold half and to clamp it in engagement with the other mold half.

The upper piece or part of the right-hand section 10 will hereinafter be designated generally by the reference 10a while the lower piece or part will be referred to by the designation 10b. As best shown in FIGS. 1, 2 and 3, the right-hand section 10 has a pair of relatively closely vertically spaced upper arms on the upper piece 10a, the arms being identified by the reference numbers 16 and 18. These arms extend substantially horizontally one over the other and overlie a lower substantially horizontal arm 20 which is formed on the lower piece 10b of the right-hand section 10. The arms 16, 18 and 20 are similarly shaped and overlie each other in top to bottom order of mention. Means is provided for simultaneously swinging these arms and the upper and lower pieces with which they are associated in the right-hand section about the vertical axis 14 or a shaft located on said axis. Said means for swinging the arms so as to apply clamping force simultaneously through said arms to the closed halves of a mold comprises a vertical bar 22 which extends between and is connected to both pieces of the right-hand section 10. This bar is adapted to be engaged by suitable force applying linkages in the I.S. machine to apply the clamping or "lock up" force on the molds and when operated in reverse direction to open the molds.

The upper arms 16 and 18 cooperate to movably support a combination mold carrier and clamp 24. As best seen in FIGS. 1 and 2, the mold carrier and clamp 24 is shaped to have two portions 26 and 28, each of which will support or carry one half of a mold and clamp it in engagement with a similarly supported other half.

As was mentioned, the arms 16 and 18 movably support the combination mold carrier and clamp 24. That is, a vertical stub shaft 30 extends between the arms 16 and 18 and a rear portion 32 of the carrier and clamp 24 is rotatable on said shaft. It will be noted in FIG. 3 that the rear portion 32 extends between the arms 16 and 18 and that bosses 34, 34 are provided on said rear portion to extend between the said arms and to slide over their opposed faces. The amount of pivotal movement of the carrier and clamp 24 relative to the arms 16 and 18 is limited by a vertical bar 36 that extends between and is mounted in both pieces 10a and 10b of the right-hand section. The bar 36 is not tightly embraced by the arms 16, 18 or 20, and it is not tightly embraced by a rearwardly extending portion 38 of the combination carrier and clamp 24. Thus, the carrier and clamp 24 is permitted very limited pivotal movement relative to the arms 16 and 18 and this permits mold halves supported by the carrier to be automatically centered on common vertical axes with corresponding mold halves carried by the left-hand section 12.

The lower arm 20 also supports a mold clamp member 40 which is adapted to engage and apply clamping pressure to the lower portion of mold halves carried by the combination carrier and clamp 24. The member 40 is pivotally mounted on the bottom side of the lower arm 20 as by a stub shaft 42, and it has a portion movably embracing the vertical bar 36 to limit the pivotal movement of the member 40 to that which is required for mold centering.

As shown in FIG. 5, the combination mold carrier and clamp 24 and the lower mold clamp 40 cooperate to support and to clamp the mold halves associated with the right-hand section 10. Such mold half is shown in broken outline and designated by the reference M, and it will be observed that while the mold half is carried or suspended by the combination clamp and carrier 24 which also engages its side, it is only engaged at the side and at the lower portion by the clamp member 40. When the mold halves carried by the right-hand section 10 are brought into engagement with the mold halves carried by the left-hand section 12, sufficient clamping force throughout the vertical extent of their engagement is assured by reason of the fact that the parts 10a and 10b of the two-piece section 10 can be moved relative to each other at least a slight amount. That is, when the glassware forming machine linkages close the mold halves, the upper portions of the mold halves may engage firmly before the lower portions of the mold halves engage. However, the continued application of force to the mold arms 16, 18 and 20 through the vertical bar 22 will cause the lowermost arm 20 to move inwardly a slight amount relative to the upper arms 16 and 18 so as to apply the necessary clamping pressure to the lower portion of the engaged mold halves. This movement of the arm 20 relative to the upper arms 16 and 18 occurs on the horizontal lines 44 and 46 of their engagement. The relative movement is only very slight, but that is all that is required to provide the necessary clamping or "lock up" force.

The left-hand section 12 of the mold holder apparatus is very similar to the right-hand section 10. That is, the left-hand section includes substantially horizontal upper arms 16 and 18 and a lower arm 20, the upper arms cooperating to pivotally support a combination carrier and clamp 24, and the lower arm pivotally supporting a mold clamp 40. However, the left-hand section 12 is all in one piece so that all of the said arms are formed integrally, and no relative movement is permitted between them. Additionally, the left-hand section 12 differs from the right-hand section 10 in that a single shaft or pintle 48 extends vertically through all of the arms 16, 18 and 20 to pivotally mount the members 24 and 40. Thus, the single pintle 48 provides a substitute for the two stub shafts 30 and 42 employed in the right-hand section 10.

Due to the one-piece construction of the left-hand section 12 it provides a firm clamping base and mold half carrier against which the forces applied by the right-hand section 10 can be directed in engaging the mold halves. That is, the rigid construction of the left-hand section 12 permits it to hold its associated mold halves very firmly while the mold halves carried by the right-hand section are closed against it. The two-piece right-hand section permits limited relative movement of the mold clamping parts to assure that the mold halves will be firmly clamped throughout the vertical extent of their engagement.

The invention claimed is:

1. A mold holder apparatus for a glassware forming machine of the type having separable mold halves that engage in a substantially vertical plane to define the mold cavity and comprising right and left-hand sections that are pivotally supported on a common substantially vertical axis, one of said sections being of one-piece construction having at least one substantially horizontal upper arm and one substantially horizontal lower arm that cooperate to support one mold half and to clamp it in engagement with the other mold half when the said sections are pivoted toward each other, the other of said sections being of two-piece construction with one piece having at least one substantially horizontal upper arm and the second piece having one substantially horizontal lower arm that cooperates with the associated upper arm to support the said other mold half and to clamp it in engagement with the said one mold half, and each of said sections having means for applying a clamping force simultaneously to its arms, the arms on said other of said sections being movable relative to each other at least a slight amount to assure forceful engagement of the mold halves in said substantially vertical plane.

2. A mold holder apparatus as defined in claim 1 wherein each section arm movably supports a mold clamp engageable with the associated mold half to permit automatic centering of the mold halves on a common vertical axis when the mold halves are engaged.

3. A mold holder apparatus as defined in claim 1 wherein each upper arm movably supports a combination mold holder and clamp for carrying and clamping the associated mold half, and wherein each lower arm movably supports a clamp engageable with the associated mold half to permit automatic centering of the mold halves on a common vertical axis when the mold halves are engaged.

4. A mold holder apparatus for a glassware forming machine of the type having separable mold halves that engage in a substantially vertical plane to define the mold cavity and comprising right and left-hand sections that are pivotally supported on a common substantially vertical axis, one of said sections being of one-piece construction having a pair of relatively closely vertically spaced upper arms and a lower arm all of which are substantially horizontal and which cooperate to support one mold half and to clamp it in engagement with the other mold half when said sections are pivoted toward each other, the other of said sections being of two-piece construction with one piece having a pair of relatively closely vertically spaced upper arms and the other piece having a lower arm all of which arms are substantially horizontal and cooperate to support the other mold half and to clamp it in engagement with said one mold half, and each of said sections having means for applying a clamping force simultaneously to its arms, the lower arm on said other of said sections being movable relative to the associated upper arms at least a slight amount to assure forceful engagement of the mold halves along the vertical extent of said substantially vertical plane.

5. A mold holder apparatus as defined in claim 4 wherein the means for applying a clamping force to each of said sections comprises a vertical bar connected with each arm of the associated section and connectible with force means.

6. A mold holder apparatus as defined in claim 5 wherein the upper arms of each section cooperate to pivotally support a combination mold holder and clamp for carrying and clamping the associated mold half, and wherein the lower arm of each section pivotally supports a mold clamp engageable with the associated mold half to permit automatic centering of the mold halves on a common vertical axis when the mold halves are engaged.

References Cited by the Examiner

UNITED STATES PATENTS

| 1,534,878 | 4/1925 | Stenhouse | 65—357 |
| 2,018,785 | 10/1935 | Harrison | 65—360 |
| 2,316,969 | 4/1943 | Mitchell | 65—360 XR |

DONALL H. SYLVESTER, *Primary Examiner.*

A. D. KELLOGG, *Assistant Examiner.*